United States Patent Office 2,960,643
Patented Nov. 15, 1960

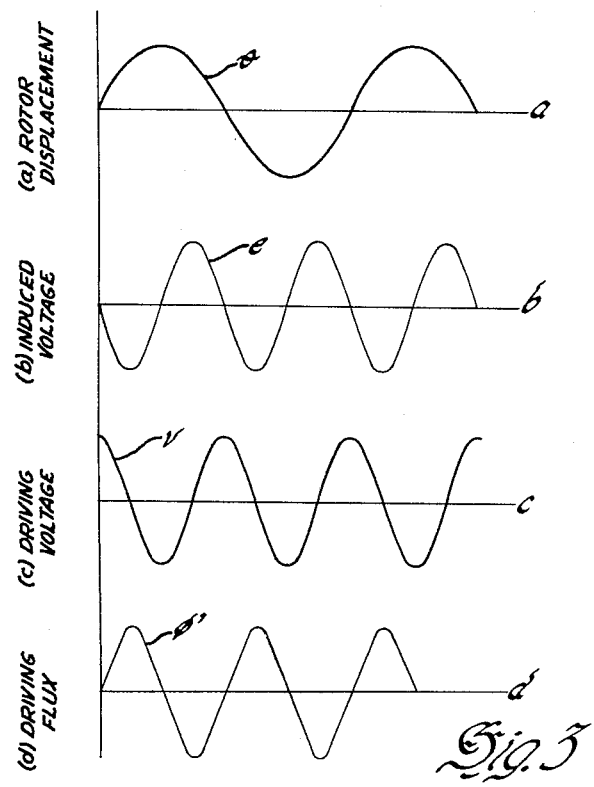
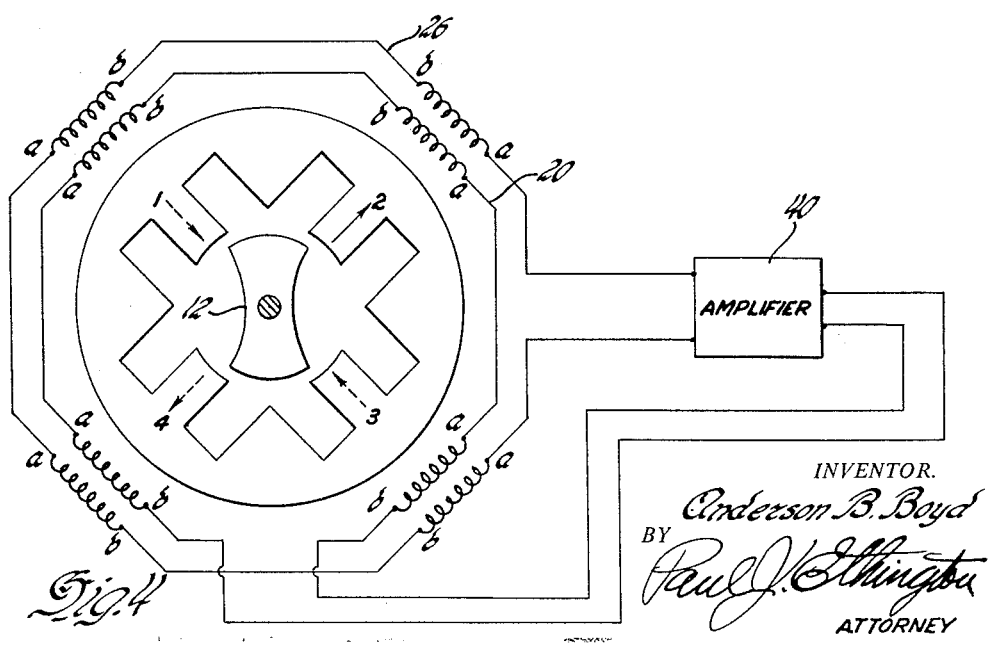

2,960,643

ELECTROMAGNETIC HARMONIC OSCILLATION DEVICE

Anderson B. Boyd, Milwaukee, Wis., assignor to General Motors Corporation, Detroit, Mich., a corporation of Delaware Filed July 9, 1958, Ser. No. 747,393

11 Claims. (Cl. 318—124)

This invention relates to apparatus for producing harmonic angular oscillations and more particularly to such apparatus employing an electromagnetic device as a resonant element.

It is a principal object of this invention to provide a harmonic oscillator capable of providing either mechanical or electrical output energy of precisely controlled frequency and amplitude. In accordance with this invention, an electromagnetic device is used as the resonant element and comprises a stator having symmetrically arranged poles within which is disposed a rotor capable of angular motion. An elastic restoring torque is imparted to the rotor, either electrically or mechanically, and the stator is provided with excitation coils having a winding sense and excitation current to produce a magnetomotive force pattern which causes variation of the restoring torque so that it is greater in the second and fourth quadrants than in the first and second quadrants of displacement whereby the rotor executes sustained angular oscillation.

A more complete understanding of this invention may be had from the detailed description which follows taken with the accompanying drawings in which:

Figure 3 is a diagram showing the phase and frequency relation of the alternating quantities in the apparatus of Figures 1 and 2;

Figure 4 is a diagram of a different embodiment of a harmonic drive unit; and

Figure 1:
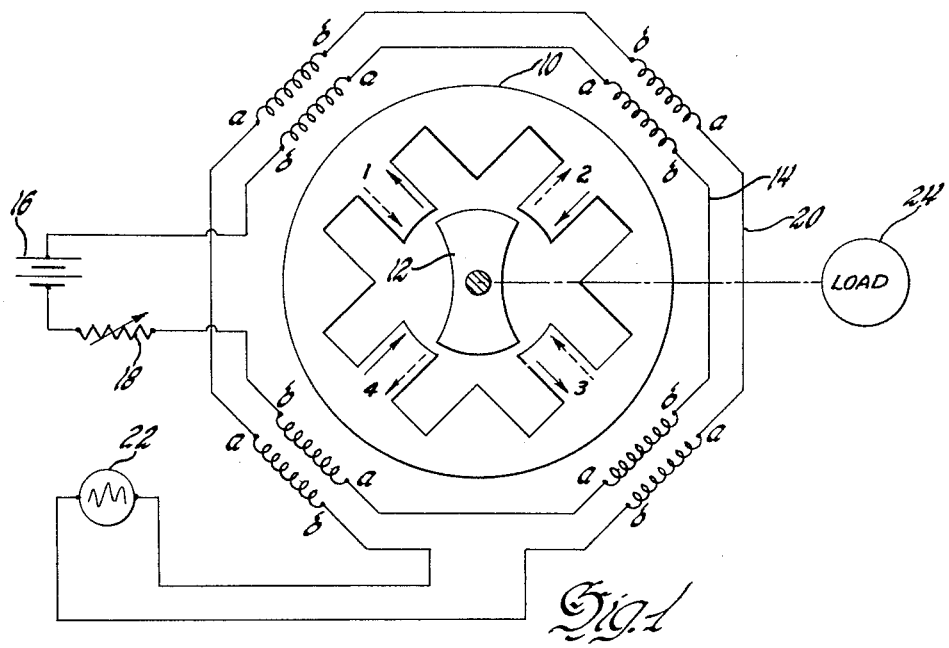
Figure 1 is a diagrammatic representation of a harmonic oscillator with an external excitation source.

Referring now to the drawings, there is shown an illustrative embodiment of the invention wherein the electromagnetic device takes the form of a conventional rotary microsyn. As shown in Figure 1, the microsyn comprises a stator 10 which is generally circular in configuration and is suitably constructed of a stack of laminations of magnetic material. The stator has four reentrant poles, numbered consecutively 1 through 4, each of which terminates in a pole face which forms a circular arc in cross section. The rotor 12 is mounted in suitable bearings or a torsion wire suspension (not shown) concentrically with the pole faces of the stator and is likewise constructed of a stack of laminations of magnetic material. The rotor is provided with diametrically opposite arcuate pole faces which span a distance between the center lines of adjacent stator pole faces and which provide a uniform air gap in the magnetic circuit between the rotor and the stator.

The stator is provided with an excitation winding 14 including a coil on each pole and the coils are serially connected across a direct voltage source 16 in series with a variable resistor 18 providing precise adjustment of the excitation current. The stator is also provided with an excitation winding 20 which includes a coil on each pole and the coils are serially connected across an alternating voltage source 22. The rotor 12 is mechanically connected to a load device 24 to which it is desired to impart harmonic angular oscillations. To facilitate description of the windings, a convention is adopted to indicate the relative direction of the windings by representation of the magnetomotive force patterns at a given instant of time. Each coil has one end designated $a$ and its other end designated $b$ and the coil has a winding sense on its pole such that current flow from $a$ to $b$ produces an inwardly directed flux and the current flow from $b$ to $a$ produces an outwardly directed flux. Conversely, an inwardly directed flux produces an induced voltage causing current flow from $a$ to $b$ and an outwardly directed flux produces an induced voltage causing current flow from $b$ to $a$. The direction of a direct or unidirectional component of flux is indicated by the solid line arrows on the poles and the direction of an alternating component of flux at a given instant of time is indicated by the dashed-line arrows on the poles.

Considering now the excitation winding 14, it is noted that the coils produce a magnetomotive force pattern in which the flux is directed alternately outwardly and inwardly in poles 1 through 4. This magnetomotive force pattern causes the rotor to assume a reference position in which the flux density is equal and opposite in poles 1 and 2 and equal and opposite in poles 3 and 4. This is the configuration of a conventional microsyn elastic restraint generator and the magnetomotive force pattern produces a restoring torque on the rotor which is linearly proportional to the angular displacement of the rotor from its reference position. The rotor will have a mechanical resonance frequency of angular oscillation determined by its moment of inertia and the sum of electrical and mechanical restoring torques.

In order to produce angular oscillation of the rotor, the magnetomotive force pattern is modulated by the excitation winding 20. At the particular time represented, the magnetomotive force pattern produced by the coils of winding 20 is alternately inwardly and outwardly in poles 1 through 4 and thus in opposition to the magnetomotive force pattern produced by the winding 14. The frequency of the alternating voltage source 22 is twice the mechanical resonance frequency of the rotor 12 and consequently the alternating magnetomotive force produces a driving flux which opposes the restoring torque during the first and third quadrants and which aids the restoring torque during the second and fourth quadrants of angular oscillation of the rotor 12. This relationship is apparent from the wave-forms represented in Figure 3. Assume that the rotor 12 is executing angular harmonic oscillation at its mechanical resonance frequency as shown in Figure 3a where the angular displacement $\theta$ is a sinusoidal function of time. The alternating voltage source 22 develops a driving voltage $v$, shown in Figure 3c, of double frequency and having a phase relation with rotor displacement such that the peak voltage coincides in time with the maximum and zero rotor displacement angles. As shown in Figure 3d, the driving voltage $v$ applied to the driving coils 20 will produce a driving flux $\phi'$ which is 90° lagging relative to the voltage. The driving flux is thus in a phase relation with the rotor displacement angle such that it opposes the restoring torque during the first and third quadrants of displacement and aids the restoring torque during the second and fourth quadrants of displacement. It will be understood that with the windings energized as described any slight disturbance will cause displacement of the rotor 12 from its reference position and will initiate the harmonic oscillation thereof. The frequency of oscillation may be accurately determined by correlated adjustment of the frequency of source 22 and excitation current in winding 14 and the amplitude of oscillation may be determined by the amplitude of the driving voltage.

Figure 2:
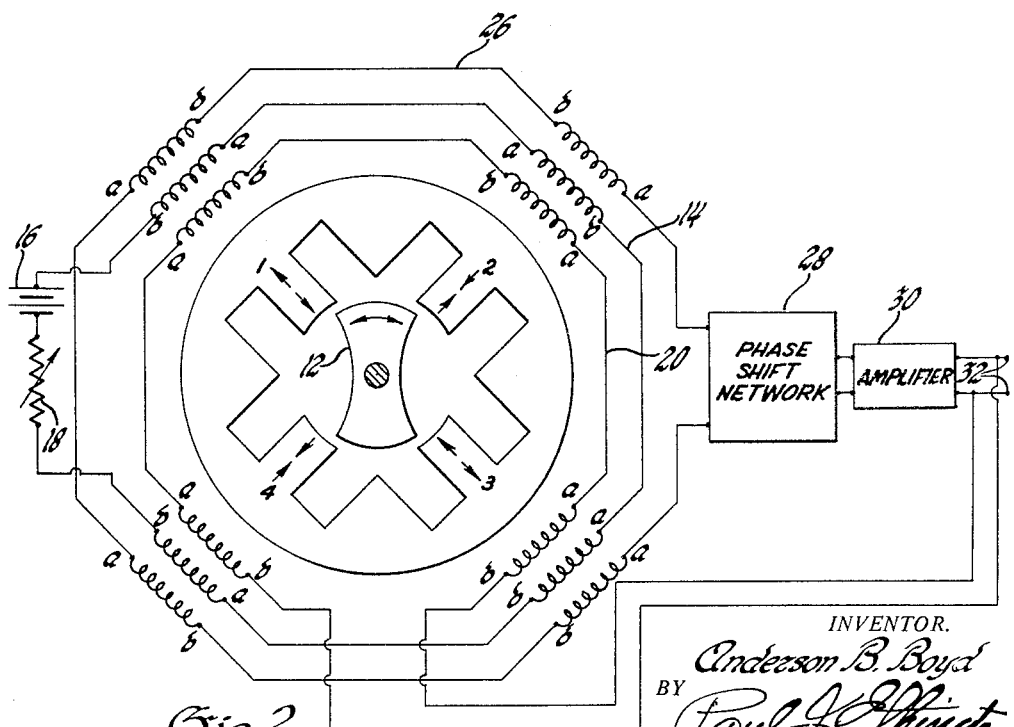
Figure 2 is a diagram of a harmonic oscillator with self-excitation.

In Figure 2, there is shown an embodiment of the invention wherein the driving voltage is developed by a feedback circuit and no external alternating voltage source is required. The microsyn structure is the same as that described with reference to Figure 1 and is provided with an excitation winding 14, a primary winding 20 and is additionally provided with a feedback or secondary winding 26. The coils of the secondary winding are disposed to produce the same magnetomotive force pattern as that of the primary winding 20 and are connected serially to develop a feedback voltage which is applied through a phase shift network 28 and amplifier 30 to the primary winding 20. In this embodiment, a double frequency driving voltage is developed by the winding 26 from the angular oscillation of the rotor 12 at its mechanical resonance frequency. The development of a driving voltage having the desired frequency and phase will be explained with reference to Figure 3 and the following considerations. The flux through poles 1 and 2 due to the direct current excitation in winding 14 is $$\phi = \frac{K_1}{R_1 + R_2} \tag{1}$$

where $K_1$ is the constant magnetomotive force, and $R_1$ and $R_2$ are the reluctances of the air gaps at poles 1 and 2, and $$R_1 = \frac{L}{uA_1} \tag{2}$$

$$R_2 = \frac{L}{uA_2} \tag{3}$$

where

L is the length
$u$ is the permeability, and
$A_1$ and $A_2$ are the areas of the air gaps.

If the rotor angle $\theta$ is measured clockwise from the reference position in which the air gap area is $A_0$ then $$A_1 = A_0 - K_2\theta \tag{4}$$

$$A_2 = A_0 + K_2\theta \tag{5}$$

Substituting these expression for reluctance and air gap areas in Equation 1 and rearranging yields $$\phi = K_3(A_0^2 - K_2^2\theta^2) \tag{6}$$

The air gap area of pole 1 is zero when the rotor is at its extreme displacement angle $\theta_2$ and from Equation 4

$$K_2 = \frac{A_0}{\theta_e} \tag{7}$$

The Equation 6 for flux may be written $$\phi = K_4\left[1 - \left(\frac{\theta}{\theta_e}\right)^2\right] \tag{8}$$

If the rotor executes harmonic angular oscillation as shown in Figure 3a, $$\theta = \theta_m \sin wt \tag{9}$$

and $$\left(\frac{\theta}{\theta_e}\right)^2 = \left(\frac{\theta_m}{\theta_e}\right)^2 \sin^2 wt \tag{10}$$

Substituting this expression in Equation 8, the flux through poles 1 and 2 varies according to $$\phi = K_4(1 - K_5 \sin^2 wt) \tag{11}$$

This flux variation will induce a voltage $e$ in the coils of poles 1 and 2 which corresponds to the first time derivative of Equation 11

$$e = -K_6 \sin wt \cos wt$$

or $$e = -K_6 \sin 2wt \tag{12}$$

This double frequency voltage $e$, appearing at output terminals 32 and shown in Figure 3b, is applied to the phase shift network 28 which imparts a 90° lagging phase shift thereto to develop the driving voltage $v$ shown in Figure 3c. This driving voltage is amplified without phase shift by the amplifier 30 and applied to the primary winding 20 which develops a driving flux $\phi'$ having the phase relation shown in Figure 3d to oppose the restoring torque during the first and third quadrants and to aid the restoring torque during the second and fourth quadrants of oscillatory displacement of the rotor. In this embodiment, the frequency of oscillation is determined by the combined mechanical and electrical restoring torques and the amplitude of oscillation is determined by the amplitude of the driving voltage and the phase of the driving voltage.

Figure 5:
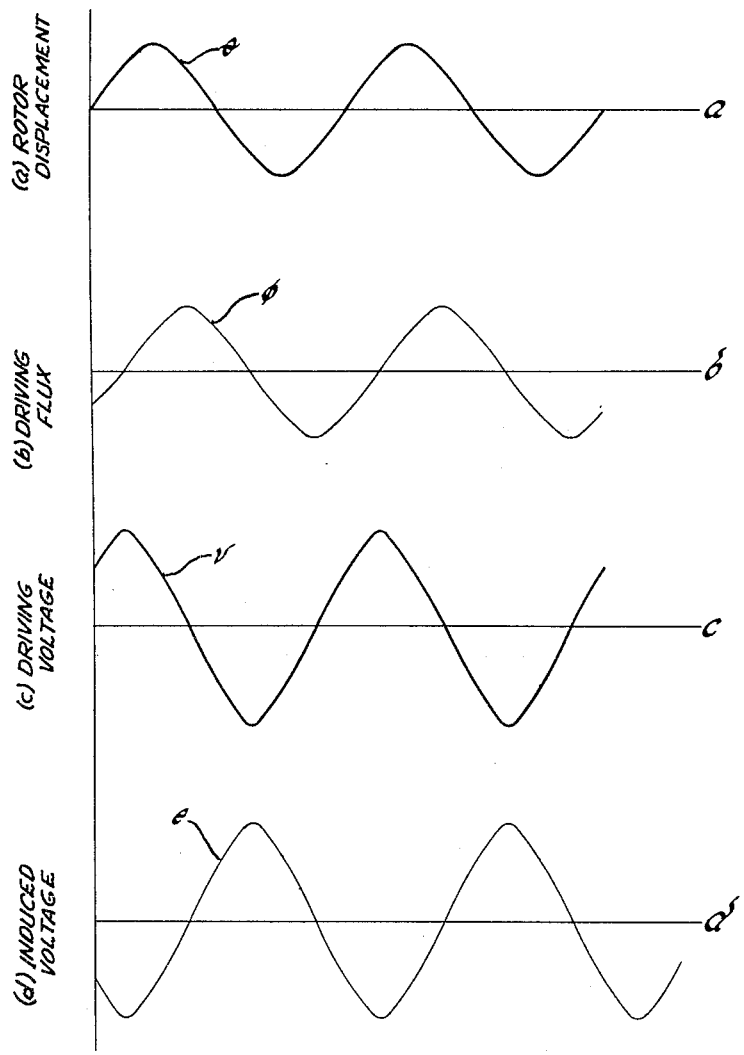
Figure 5 is a diagram showing the phase and frequency relation of the alternating quantities in the apparatus of Figure 4.

In Figure 4, there is shown a different embodiment of the invention wherein the driving voltage is of the same frequency as the mechanical resonance frequency. The microsyn structure is the same as previously described and the configurations of the primary and secondary windings 20 and 26 remain the same but the excitation winding 14 is omitted. This oscillation will be sustained at its maximum amplitude and at the mechanical resonance frequency of the rotor by a driving flux $\phi$ of the same frequency and in the phase relation shown in Figure 5b. The driving voltage $v$ to produce this flux must lead the flux by 90 degrees and thus lag the rotor displacement by 45 degrees as shown in Figure 5c. An induced voltage $e$ in secondary winding 26 will lag the flux by 90 degrees as shown in Figure 5d. It is noted that the driving voltage V is in phase opposition to the induced voltage $e$ and may be developed therefrom by phase inversion in amplifier 40.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A drive unit for producing harmonic vibrations comprising a stator having symmetrically disposed poles, a rotor of magnetic material mounted for angular displacement within said stator, means for imparting a restoring torque to said rotor tending to maintain the rotor in a reference position relative to said poles, said rotor having a resonant frequency of angular vibration determined by its inertia and the magnitude of the restoring force, a winding having a coil on each of said poles, a source of alternating voltage connected across the series connection of said coils, said coils being disposed on the poles in a manner to produce a magnetomotive force pattern in which the forces are directed alternately inwardly and outwardly whereby it opposes the restoring torque in the first and third quadrants of rotor displacement and aids the restoring torque in the second and fourth quadrants of rotor displacement whereby the rotor is maintained in angular harmonic vibration.

2. A drive unit for producing harmonic vibrations comprising a stator having symmetrically disposed poles, a rotor of magnetic material mounted within the stator, means for imparting a restoring torque to said rotor tending to maintain said rotor in a reference position relative to said poles, said rotor having a fundamental resonant frequency of angular vibration determined by its inertia and the magnitude of the restoring force, a winding having a coil on each of said poles, the coils being connected in series to produce a magnetomotive force pattern in which the forces are directed alternately inwardly and outwardly, and a source of alternating voltage of twice said fundamental frequency connected across the series connection of said windings.

3. A drive unit for producing harmonic vibrations comprising a stator having symmetrically disposed poles, a rotor of magnetic material mounted within the stator, means for imparting a restoring torque to said rotor tending to maintain said rotor in a reference position relative to said poles, said rotor having a fundamental resonant frequency of angular vibration determined by its inertia and the magnitude of the restoring force, a first winding having a coil on each of said poles, the coils being connected in series to produce a magnetomotive force pattern in which the forces are directed alternately inwardly and outwardly, a second winding having a coil on each of said poles, the coils of the second winding being connected in series to produce a magnetomotive force pattern in which the forces are directed alternately inwardly and outwardly, a feedback circuit including phase shift and amplifying means connected between said windings whereby the voltage induced in said second winding produces an excitation current in the first winding so that the magnetomotive force pattern thereof opposes the restraining torque in the first and third quadrants and aids the restoring torque in the second and fourth quadrants of rotor displacement.

4. A drive unit for producing harmonic vibrations comprising a stator having symmetrically disposed poles, a rotor of magnetic material mounted for angular displacement within said stator, a first winding having a coil on each of said poles, said coils being connected in series to produce a magnetomotive force pattern in which the forces are directed alternately inwardly and outwardly, a direct voltage source connected across the series connection of said coils to produce a restoring torque on said rotor tending to maintain it in a reference position, said rotor having a resonant frequency of angular vibration determined by its inertia and the magnitude of the restoring force, a second winding having a coil on each of said poles, a source of alternating voltage connected across the series connection of said coils, said coils being disposed on the poles in such manner that the magnetomotive force pattern opposes the restoring torque in the first and third quadrants of rotor displacement and aids the restoring torque in the second and fourth quadrants of rotor displacement whereby the rotor is maintained in angular harmonic vibration.

5. A drive unit for producing harmonic vibrations comprising a stator having symmetrically disposed poles, a rotor of magnetic material mounted for angular displacement within said stator, a first winding having a coil on each of said poles, said coils being connected in series to produce a magnetomotive force pattern in which the forces are directed alternately inwardly and outwardly, a direct voltage source connected across the series connection of said coils to produce a restoring torque on said rotor tending to maintain it in a reference position, said rotor having a resonant frequency of angular vibration determined by its inertia and the magnitude of the restoring force, a second winding having a coil on each of said poles, the coils of the second winding being connected in series to produce a magnetomotive force pattern in which the forces are directed alternately inwardly and outwardly, a third winding having a coil on each of said poles, the coils of the third winding being connected to produce a magnetomotive force pattern in which the forces are directed alternately inwardly and outwardly, a feedback circuit including phase shift and amplifying means connected between said second and third windings whereby the voltage induced in said third winding produces an excitation current in the second winding so that the magnetomotive force pattern thereof opposes the restoring torque in the first and third quadrants and aids the restoring torque in the second and fourth quadrants of rotor displacement.

6. A drive unit for producing harmonic vibrations comprising a stator having symmetrically disposed poles, a rotor of magnetic material mounted for angular displacement within said stator, first, second and third windings on said stator, each winding having a coil on each pole and the coils of each winding being connected in series to produce a magnetomotive force pattern in which the forces are directed alternately inwardly and outwardly, a source of direct voltage connected across the first winding to produce a restoring torque on the rotor, and a feedback circuit connected between the second winding and the third winding, said circuit including phase shift and amplifying means whereby the voltage induced in the second winding produces an excitation current in the third winding so that the magnetomotive force pattern thereof opposes the restoring torque in the first and third quadrants and aids the restoring torque in the second and fourth quadrants of rotor displacement.

7. A drive unit for producing harmonic vibrations comprising a stator having symmetrically disposed poles, a rotor of magnetic material mounted for angular displacement within said stator, first and second windings on said stator, each winding having a coil on each pole and the coils of each winding being connected in series to produce a magnetomotive force pattern in which the forces are directed alternately inwardly and outwardly, and a feedback circuit connected between the first winding and the second winding, said circuit including phase shift and amplifying means whereby the voltage induced in the first winding produces an excitation current in the second winding so that the magnetomotive force pattern thereof produces less restoring torque in the first and third quadrants than in the second and fourth quadrants of rotor displacement.

8. A drive unit for producing harmonic vibrations comprising a stator having symmetrically disposed poles, a rotor of magnetic material mounted for angular displacement within said stator, first, second and third windings on said stator, each winding having a coil on each pole and the coils of each winding being connected in series to produce a magnetomotive force pattern in which the forces are directed alternately inwardly and outwardly, a source of direct voltage connected across the first winding to produce a restoring torque on the rotor, said rotor having a resonant frequency of angular vibration determined by its inertia and the magnitude of the restoring torque, said second winding developing an induced voltage of double frequency from said angular vibration of the rotor, a feedback circuit connected between the second winding and the third winding, said circuit including amplifying and phase shift means for imparting to said induced voltage a lagging phase shift of 0 to 180°, said third winding developing an excitation current of double frequency from the feedback voltage so that the magnetomotive force pattern thereof opposes the restoring torque in the first and third quadrants and aids the restoring torque in the second and fourth quadrants of angular vibration of the rotor.

9. A drive unit for producing harmonic vibrations comprising a stator having symmetrically disposed poles, a rotor of magnetic material mounted for angular displacement within said stator, first and second windings on said stator, each winding having a coil on each pole and the coils of each winding being connected in series to produce a magnetomotive force pattern in which the forces are directed alternately inwardly and outwardly, said rotor having a resonant frequency of angular vibration determined by its inertia and the magnitude of the restoring torque, said first winding developing an induced voltage of fundamental frequency from said angular vibration of the rotor, a feedback circuit connected between the first winding and the second winding, said circuit including amplifying and phase shift means for imparting to said induced voltage a phase shift between 135° leading and 135° lagging, said second winding developing an excitation current of fundamental frequency from the feedback voltage so that the magnetomotive force pattern thereof produces less restoring torque in the first and third quadrants than in the second and fourth quadrants of angular vibration of the rotor.

10. A drive unit for producing harmonic vibrations comprising a stator having symmetrically disposed poles, a winding having a coil on each of said poles, an alternating voltage source connected with said coils, the coils on adjacent poles being wound in a direction to produce a magnetomotive force pattern in which the forces are directed alternately inwardly and outwardly, a rotor of magnetic material mounted for angular displacement and having a reference position in symmetrical alignment with adjacent poles, means for imparting a restoring torque to said rotor tending to maintain it in said reference positions, said alternating voltage source having a frequency corresponding to the mechanical resonance frequency of the rotor whereby said magnetomotive force pattern opposes the restoring torque in the first and third quadrants and aids the restoring torque in the second and fourth quadrants of rotor displacement to maintain the rotor in angular harmonic vibration.

11. A drive unit for producing harmonic vibrations comprising a stator having symmetrically disposed poles, a winding including a coil on each of said poles, the coils on adjacent poles being wound in opposite directions, an alternating voltage source connected across the series connection of said coils to produce a magnetomotive force pattern in which the forces are directed alternately inwardly and outwardly, a rotor of magnetic material mounted for angular displacement and having a reference position in symmetrical alignment with adjacent poles, means for imparting a restoring torque to said rotor tending to maintain it in said reference positions, said alternating voltage source having frequency corresponding to the mechanical resonance frequency of the rotor whereby said magnetomotive force pattern opposes the restoring torque in the first and third quadrants and aids the restoring torque in the second and fourth quadrants of rotor displacement to maintain the rotor in angular harmonic vibration.

References Cited in the file of this patent

UNITED STATES PATENTS 1,202,446 Speed _____ Oct. 24, 1916

FOREIGN PATENTS 377,047 Great Britain _____ July 21, 1932